(12) United States Patent
Minamitani et al.

(10) Patent No.: US 9,364,013 B2
(45) Date of Patent: Jun. 14, 2016

(54) PROCESS FOR PRODUCTION OF FRIED NOODLES

(75) Inventors: Koshi Minamitani, Osaka (JP); Mitsuru Tanaka, Osaka (JP)

(73) Assignee: NISSIN FOODS HOLDINGS CO., LTD., Osaka-Shi (JP)

( * ) Notice: Subject to any disclaimer, the term of this patent is extended or adjusted under 35 U.S.C. 154(b) by 121 days.

(21) Appl. No.: 13/825,425

(22) PCT Filed: Sep. 26, 2011

(86) PCT No.: PCT/JP2011/071881
§ 371 (c)(1),
(2), (4) Date: Jun. 12, 2013

(87) PCT Pub. No.: WO2012/039495
PCT Pub. Date: Mar. 29, 2012

(65) Prior Publication Data
US 2013/0251875 A1    Sep. 26, 2013

(30) Foreign Application Priority Data
Sep. 24, 2010   (JP) ................................. P2010-21455

(51) Int. Cl.
*A23L 1/162* (2006.01)
*A23L 1/16* (2006.01)
*A23L 1/00* (2006.01)

(52) U.S. Cl.
CPC .............. *A23L 1/162* (2013.01); *A23L 1/0005* (2013.01); *A23L 1/1613* (2013.01)

(58) Field of Classification Search
USPC ................................................ 426/557, 451
See application file for complete search history.

(56) References Cited

U.S. PATENT DOCUMENTS

| | | | | |
|---|---|---|---|---|
| 4,269,113 A | * | 5/1981 | Ishida | ............................. 99/404 |
| 4,988,528 A | | 1/1991 | Tomoda | |
| 2002/0160093 A1 | * | 10/2002 | Sakai et al. | .................... 426/557 |
| 2004/0105929 A1 | | 6/2004 | Tomoda et al. | |
| 2009/0004336 A1 | * | 1/2009 | La et al. | .......................... 426/85 |

FOREIGN PATENT DOCUMENTS

| | | |
|---|---|---|
| CN | 1142910 | 2/1997 |
| CN | 101686717 | 3/2010 |
| CN | 101720890 | 6/2010 |
| EP | 0754410 | 1/1997 |
| JP | 57-094261 | 6/1982 |
| JP | 2005-65511 | 3/2005 |
| JP | 2005-218418 | 8/2005 |
| RU | 2152735 C2 | 7/2000 |

OTHER PUBLICATIONS

Search report from China in CN 201180056791.4, mail date is Jan. 24, 2014.

(Continued)

*Primary Examiner* — Lien T Tran
(74) *Attorney, Agent, or Firm* — Greenblum & Bernstein, P.L.C.

(57) ABSTRACT

Fried noodles of excellent quality that are approximately 1 to 7 cm in length can be produced efficiently by a process for production of fried noodles including: a step of preparing raw noodles; a step of gelatinizing the raw noodles; a step of cutting the gelatinized raw noodles into noodles of 1 to 7 cm; and a step of frying the cut noodles by allowing the same to naturally float in frying oil.

2 Claims, 4 Drawing Sheets

(56) References Cited

OTHER PUBLICATIONS

E.P.O. Office action in EP 11826937.2, mail date is Feb. 6, 2014.
The Instant Ramen Invention Story, The Instant Ramen Invention Museum, Jun. 14, 2000, pp. 44-45 with Partial English Translation.
World Food born in Japan: All Instant Ramens, Japan Food Journal Co., Ltd., Dec. 20, 2004, pp. 68, pp. 70-72 with Partial English Translation.
Shizuyuki Ota, Etsuji Yuki, Theory and Practice of Fried Food, Saiwai Shobo, Apr. 1, 1989, pp. 172-175 with Partial English Translation.
Japan Food Journal, Jul. 14, 2010, pp. 3 with partial English translation.
Nikkan Kogyo Shinbun, Jul. 13, 2010, pp. 15 with partial English translation.
Japan Food Journal, Jul. 12, 1999, pp. 7 with partial English translation.
English translation of International Report on Patentability issued Apr. 25, 2013 in PCT/JP2011/071881.
Japanese Office Action issued with respect to Japanese Patent Application No. 2012-506249, dated May 8, 2012.
International Preliminary Report on Patentability for PCT/JP2011/071881, mailed Apr. 25, 2013, with translation.
Office Action (Notice of Allowance) issued with respect to Russian Application No. 2013118702, mail date is Mar. 10, 2016.

* cited by examiner

PROCESS FOR PRODUCTION OF FRIED NOODLES

TECHNICAL FIELD

The present invention relates to a process for production of fried noodles. More particularly, the present invention relates to a process for producing fried noodles having a length of approximately 1 to 7 cm.

BACKGROUND ART

Since only hot water is needed to eat instant fried noodles, instant fried noodles have widely been used.

In recent years, noodles as short as approximately 1 to 7 cm that can be eaten in soup form with a spoon have been increasingly needed to respond to various customers' tastes. Likewise with respect to instant fried noodles, products that meet such needs are required to be made.

However, conventional processes for producing instant fried noodles are mainly used for the noodles having a length of approximately 20 cm to 70 cm. For this reason, applying such conventional processes for producing instant fried noodles, directly to fried noodles having a length of approximately 1 to 7 cm causes various problems in the production processes. Problems occur in the quality of resultant fried noodles as well.

Patent Document 1, for example, discloses a process for producing short fried noodles in which long noodles are fried and then cut into pieces short enough to be scooped up with a spoon.

CITATION LIST

Patent Literature

[Patent Document 1] Japanese Patent Application Publication No. 2005-218418

SUMMARY OF INVENTION

Technical Problem

However, the problem of the production process of Patent Document 1 is its production efficiency due to the step added to a conventional production process.

As disclosed specifically in Patent Document 1, "pieces short enough to be scooped up with a spoon" means pieces of 1.5 mm in length, which is significantly different from the noodles of approximately 1 to 7 cm of the present application. Therefore, application of this production process was difficult.

In other words, the inventors of the present invention had discovered that a process for frying long fried noodles and cutting the fried long noodles into noodles of approximately 1 to 7 cm generates noodle pieces of a desired length or shorter when cutting the noodles, reducing the yield. The inventors of the present invention had also discovered that cutting the fried noodles easily creates asperity on the cut surfaces of the noodles, deteriorating the texture of the noodles.

Thus, in the field of instant fried noodles, no methods have been established for efficiently producing fried noodles of excellent quality that are approximately 1 to 7 cm in length. In order to solve the problems described above, the inventors of the present invention aim to discover a process for efficient production of fried noodles of excellent quality that are approximately 1 to 7 cm in length.

Solution to Problem

As a result of diligent research by the inventors of the present invention, the inventors had discovered that, in order to obtain noodles having a length of approximately 1 to 7 cm, it is effective to use a process for gelatinizing noodles, cutting the gelatinized noodles into noodles of approximately 1 to 7 cm, and thereafter frying the cut noodles while allowing the cut noodles naturally float in frying oil. In a conventional process for cutting gelatinized noodles into noodles having a length of approximately 1 to 7 cm, storing the cut noodles in a retainer, and then soaking the retainer in frying oil to fry the noodles, swelling is detected on the surfaces of the resultant noodles. The inventors of the present invention had found that this process is not preferred in terms of appearance and texture of noodles. When swelling occurs in noodles, the structure of the noodles become hollow, making the noodles absorb hot water (water) quickly and consequently become soggy. In other words, when using hot water to reconstitute such noodles that include many swollen sections, the level of softness varies between the swollen sections and other sections that are not swollen, resulting in non-uniform texture. The inventors of the present invention had also found a problem in which the resultant noodles clump together and form lumps. The inventors of the present invention had discovered that, as a way to improve these issues, frying cut noodles while allowing the cut noodles naturally float in frying oil is effective.

Based on this knowledge, the inventors of the present invention had completed the present invention. Specifically, the present invention is a process for production of noodles of approximately 1 to 7 cm, which has the steps of: preparing raw noodles; gelatinizing the raw noodles; cutting the gelatinized raw noodles into noodles of approximately 1 to 7 cm; and frying the cut noodles by allowing them to naturally float in frying oil.

The inventors of the present invention had discovered that the amount of time for frying the noodles can be shortened by soaking the fried noodles, which are fried while floating naturally in the frying oil, in the frying oil to further fry the noodles. In other words, this production process preferably has a step of frying the noodles, which are fried while floating naturally in the frying oil, by soaking them in the frying oil.

The present invention also provides instant cup noodles in which the fried noodles produced in this production process are accommodated in a cup.

Advantageous Effects of Invention

The production process according to the present invention can efficiently produce fried noodles of excellent quality that are approximately 1 to 7 cm in length. The production process according to the present invention can make the length of the noodles uniform and improve the yield by causing little noodle pieces. The production process according to the present invention can also produce noodles in such a manner as to make uniform cut surfaces thereof and to prevent surfaces of the noodles from swelling.

The instant cup noodles, in which the fried noodles produced in the production process according to the present invention are accommodated in a cup, can be used instant cup noodles that only need hot water to be eaten.

DESCRIPTION OF EMBODIMENTS

Embodiments for implementing the present invention are described hereinafter. However, it should be noted that the present invention should not be construed as being limited to the scope of these embodiments.

Each of the steps of a process for production of fried noodles of approximately 1 to 7 cm according to an embodiment of the present invention is described hereinafter.

Step of Preparing Raw Noodles

Raw noodles are prepared as follows with a usual process. Specifically, water and the like are added to and mixed with ingredients such as flour and starch, to obtain dough, which is compounded/rolled into a noodle band. The thickness of the noodle band is adjusted to a predetermined thickness. The resultant noodle band is cut into raw noodles.

Step of Gelatinizing the Raw Noodles (Gelatinizing Step)

The obtained raw noodles are gelatinized by being braised or boiled. Note that the braising and boiling process described in the present invention includes a gelatinizing process using heating steam. After the gelatinization, the noodles may be soaked or showered with flavors.

Step of Cutting the Gelatinized Noodles into Noodles of Approximately 1 to 7 Cm (Cutting Step)

Figure 1:
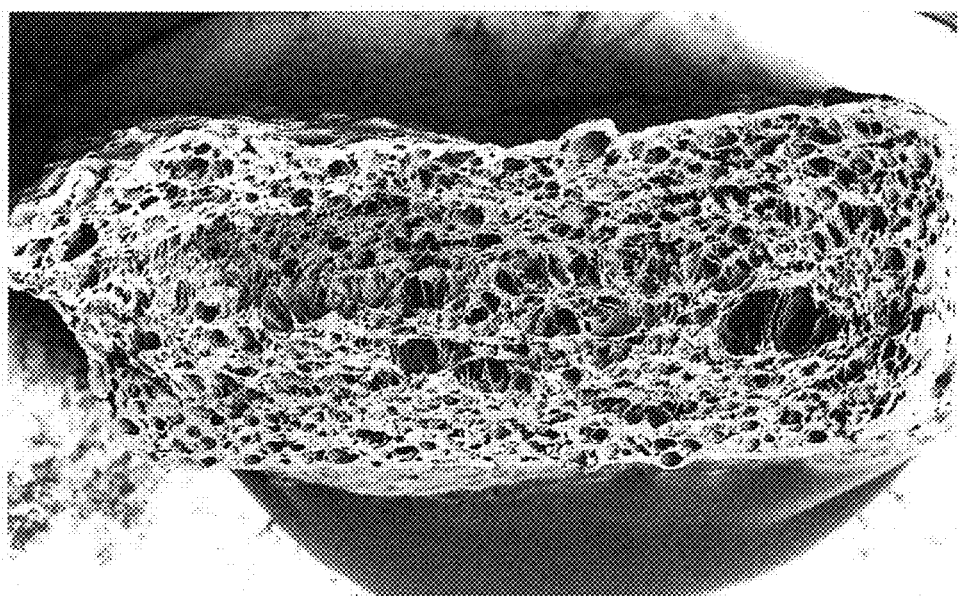
FIG. 1 is a photomicrograph of an end portion of a noodle of Comparative example 1.

The gelatinized noodles are cut into noodles of approximately 1 to 7 cm. The conventional production processes fry long noodles and then cut the fried long noodles into noodles of approximately 1 to 7 cm. However, the conventional processes cannot cut the noodles correctly, and therefore cannot obtain the desired length and result in cutting unplanned lengths of the noodles. These results in lowering the yield and generating small noodle pieces (see the results of Comparative example 1 in Test Example 1). Moreover, the conventional processes often create asperity on the cut surfaces of the noodles, as shown in FIG. 1 (Comparative example 1 of Test Example 1), making the cut surfaces of the noodles non-uniform.

The present embodiment, on the other hand, adopts a configuration in which the step of cutting noodles is provided between the gelatinizing step and a frying step. This configuration cuts noodles while the noodles still retain the flexibility thereof. Therefore, this configuration can easily cut the noodles into a desired length without scattering small noodle pieces when cutting the noodles. Accordingly, noodles with a good yield can be produced. In addition, frying the noodles after cutting the noodles can obtain uniform cut surfaces of the noodles (see FIG. 2 (Example 1 of Test Example 1)). Thus, noodles of good appearance and texture can be realized.

The process for cutting noodles into noodles of approximately 1 to 7 cm is not construed as being limited. In the course of production of general instant noodles, gelatinized noodles in a suspended state are cut by a rotary blade on a production line. This process can be applied to the present embodiment. For instance, the number of cutting operations per unit time can be increased by increasing the rotating speed of the rotary blade or increasing the number of rotary cutting teeth, so that the noodles can be cut into approximately 1 to 7 cm in length. The process for cutting noodles is not limited to cutting suspended noodles using a rotary blade. It goes without saying that a process for cutting noodles in a horizontal direction on a conveyor by using a rotary blade may also be adopted.

Step of Frying the Cut Noodles in Frying Oil by Allowing the Cut Noodles to Naturally Float Therein (Surface-Frying Step)

The noodles that are cut into approximately 1 to 7 cm in length are fried in frying oil while naturally floating therein. In other words, the cut noodles are allowed to float on the surface of the frying oil. This frying treatment is referred to as "surface-frying treatment," hereinafter.

In frying steps of the conventional processes for producing instant noodles, the entire noodles are forcibly immersed in frying oil. This frying treatment is referred to as "soak-frying treatment," hereinafter. The soak-frying treatment can be carried out by, for example, storing the noodles in a retainer, placing a lid on an upper part of the retainer, and immersing the retainer in the frying oil until the oil level reaches an upper part of the lid. When the noodles that are cut into approximately 1 to 7 cm in length are directly subjected to the soak-frying treatment, swelling is detected on the surfaces of the resultant noodles, which is not preferred in terms of the appearance and texture of the noodles. Another problem is that the resultant noodles clump together and form lumps. These problems can be solved by surface-frying the noodles that are cut into approximately 1 to 7 cm in length.

When performing the surface-frying treatment, the noodles may or may not be accommodated in the retainer. When the noodles are accommodated in the retainer, it is not necessary to place a lid on the upper part of the retainer.

It is preferred that a noodle density per unit area in the surface of the frying oil be low when performing the surface-frying treatment. This can prevent the noodles from bonding to each other and keep the fried noodles apart from one another.

More specifically, when surface-frying the noodles using a retainer, it is preferred to use a retainer having a large opening. With respect to a specific noodle density, "weight of noodles before frying/area of frying oil level" is preferably equal to or less than $1.0 \text{ g/cm}^2$, or more preferably $0.6 \text{ g/cm}^2$. Of course, the noodles that are cut into approximately 1 to 7 cm in length can be thrown sequentially from a conveyor or the like into a fry tank.

The amount of time for the surface-frying treatment is not particularly limited but is roughly 1 to 2 minutes. The temperature of the frying oil is approximately 120° C. to 170° C. The moisture content of the fried noodles is roughly 2 to 6%.

When frying the noodles within a shorter period of time, a process for showering the noodles with oil of approximately 100° C. to 150° C. prior to the surface-frying treatment is effective as well. The amount of time for the surface-frying treatment can be reduced by showering the noodles with oil. For example, the surface-frying treatment is performed by storing the noodles in the retainer, placing a lid thereon, showering the noodles with oil, and then placing the retainer in the frying oil.

In place of the surface-frying treatment, the noodles can be fried by constantly applying oil thereto. In other words, the surface-flying treatment described above can be substituted with the constant application of oil for a predetermined amount of time.

Step of Soaking the Noodles, which are Fried while Naturally Floating in the Frying Oil, in the Flying Oil to Further Fry the Noodles (Soak-Frying Step)

It is also effective to use a process for performing the surface-frying treatment first for a predetermined period of time and then performing the soak-frying treatment. Performing the surface-frying treatment for a predetermined period of time, followed by the soak-frying treatment, can keep the fried noodles apart from one another and shorten the amount of time for frying the noodles. The amount of time for frying is not particularly limited; the fried noodles can easily be kept apart from one another even when the soak-flying treatment is performed subsequently to the surface-frying treatment as long as the surface-frying treatment is performed for approximately 10 to 15 seconds. The amount of time for the soak-frying treatment is roughly 30 seconds to one minute and 30 seconds. The temperature of the frying oil is approximately 120° C. to 170° C.

Thus, it is effective to perform the soak-frying treatment subsequent to the surface-frying treatment in order to keep the fried noodles apart from one another and shorten the amount of time for frying.

Other Steps

In the present embodiment, the noodles can be treated in various manners prior to and after the cutting step.

For example, it is preferred to add a step of treating the noodles with a binding prevention agent, prior to the cutting step, in order to prevent the fried noodles from bonding to each other. This treatment can be performed by allowing passage of a soak tank containing the binding prevention agent to soak the noodles therein or by showering the noodles with solution containing the binding prevention agent. Specific examples of the binding prevention agent include soy dietary fiber and gum arabic. This step may be performed prior to or after the gelatinizing step. It goes without saying that this step may be performed after the cutting step and prior to the surface-frying step. Treating the noodles with the binding prevention agent can easily keep the fried noodles apart from one another without causing elution of the starch from the noodles to bind the surfaces of the noodles to each other. Note that, when soaking or showering the noodles with flavoring solution subsequent to the gelatinizing step, the binding prevention agent might be added to the flavoring solution, and a flavoring treatment and a binding prevention treatment may be carried out simultaneously.

It is preferred to shower the noodles with water or oil after the gelatinizing step and prior to the cutting step. In this manner, weight can be added to the noodles, and the noodles obtained in the cutting step can be prevented from scattering. Note that the binding prevention agent may be added to the water, and a scattering prevention treatment and the binding prevention treatment may be carried out simultaneously.

It is also effective to let the noodles pass between a pair of rollers having a predetermined clearance therebetween, prior to the cutting step. As a result of such treatment, the noodles can be prevented from flapping or shifting. In other words, this treatment has the effect of making it difficult for the noodles to scatter when being cut, while preventing noodle strips from being misalign with one another.

Step after Frying

After the treatment for frying the noodles, the noodles are pulled out of the frying oil. In a case where the noodles are kept apart from one another, the oil is drained from the noodles, and then the noodles are accommodated in a cup or the like. When the noodle density per unit area in the surface of the frying oil is high at the time of the surface-frying treatment, the noodles might be slightly bonded to each other. In this case, a step of applying shock or pressure to a chunk of lightly bonded noodles to separate the noodles is added. The level of binding somewhat varies depending on the noodle density obtained at the time of the surface-frying treatment, but the binding can be released by simply applying gentle physical shock to the noodles. The noodles that are separated from each other as a result of releasing the binding thereof are accommodated in a cup or the like. The cup or the like can be filled with the noodles by using a computer scale.

Instant Cup Noodles, Created by Storing the Fried Noodles of the Production Process in a Cup The fried noodles that are produced by the above-mentioned production process can be accommodated in a cup to obtain instant cup noodles. A product without soup can be produced by adding strong flavors to the fried noodles. Alternatively, soup may be added to the product. In addition to a process for directly pouring soup into a cup, a process for storing a small package of soup in the cup may be adopted. The soup may be in the form of liquid or powder. If necessary, dried ingredients may be poured directly into the cup or a small package of dried ingredients may be added to the cup.

The instant cup noodles can be recovered by pouring hot water thereon or by being cooked in a microwave. As a result, the instant cup noodles can be eaten. It goes without saying that the instant cup noodles can be recovered by heat in a pot or the like. The instant cup noodles do not have to be recovered by hot water and can be eaten as a snack.

EXAMPLES

Examples of the present invention are described hereinafter. The present invention should not be construed as being limited to these examples.

Test Example 1

Difference in Length Distribution Between Fried Noodles that are Fried and then Cut and Noodles that are Cut Prior to Frying Comparative Example 1

Process for Cutting Fried Noodles into 3 cm in Length (Conventional Process for Production of Fried Noodles)

Figure 3:
FIG. 3 is a photograph of a group of noodles according to Comparative example 1.

Saline water in an amount of 2 g and water in an amount of 340 g were added to and mixed with 900 g of flour and 100 g of starch, to obtain dough, which was then compounded/rolled into a noodle band of 1.00 mm. This noodle band was cut into noodles by using a 9th angle cutting blade. The resultant noodles were braised at 150 kg/hr for 2 minutes. Flavoring solution was allowed to pass through the noodles. The noodles on a conveyor was pinched from above by a stainless net, immersed in the fry tank, and fried at 145° C. for one minute and 30 seconds. After the noodles were fried, the net at the top was removed. The fried, straight instant noodles were sent horizontally to the rotary blade and cut into noodle pieces of approximately 3 cm. FIG. 1 is a photograph of an end portion of one of the resultant noodles, and FIG. 3 is a photograph of the entire noodles.

Example 1

Figure 2:
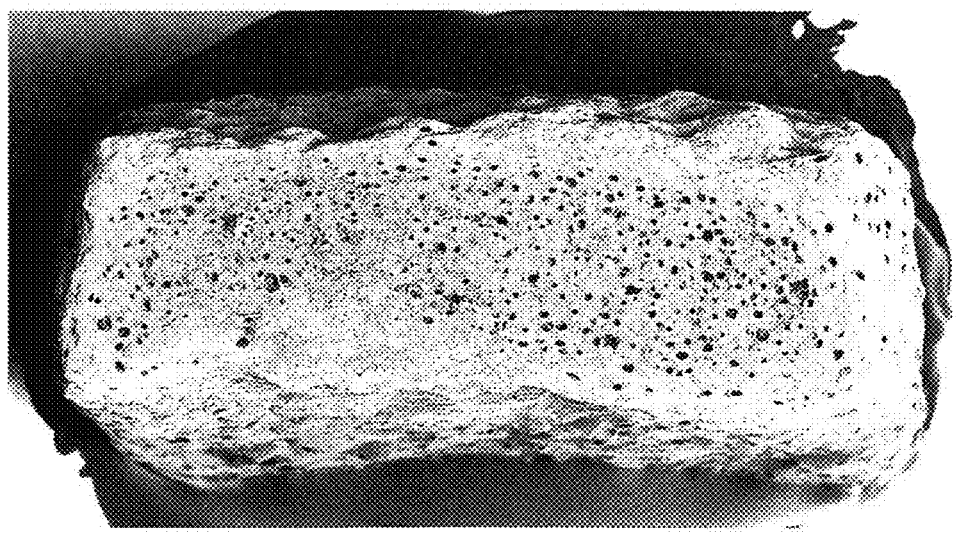
FIG. 2 is a photomicrograph of an end portion of a noodle of Example 1.
Figure 4:
FIG. 4 is a photograph of a group of noodles according to Example 1.

Process for Cutting the Noodles into Noodles of 3 cm and then Frying the Cut Noodles Saline water in an amount of 2 g and water in an amount of 340 g were added to and mixed with 900 g of flour and 100 g of starch, to obtain dough, which was then compounded/rolled into a noodle band of 1.00 mm. This noodle band was cut into noodles by using a 9th angle cutting blade. The resultant noodles were braised at 150 kg/hr for 2 minutes. Flavoring solution was allowed to pass through the noodles. The resultant noodles were cut at the rate of 300 times per minute to obtain noodles of 3 cm. Subsequently, approximately 95 g of the cut noodles was accommodated in a retainer having an opening diameter of 12 cm, a height of 4.5 cm, and a bottom diameter of 11 cm. The frying treatment was performed on the noodles accommodated in the container at 150° C. for one minute and 30 seconds in such a manner that 1 cm of an upper part of the retainer was not soaked in frying oil. Palm oil was used as the frying oil. After frying the noodles, the fried noodles were removed from the retainer. The noodles were partially bonded to each other. Therefore, gentle shock was applied thereto in order to separate the fried noodles. FIG. 2 is a photograph of an end portion of one of the fried noodles, and FIG. 4 is a photograph of the entire noodles.

Lengths of the cut noodles obtained in Comparative example 1 and Example 1 are shown in Table 1.

TABLE 1

| Length of noodles | Comparative example 1 Cutting after frying Weight ratio (%) | Example 1 Frying after cutting Weight ratio (%) |
|---|---|---|
| 1 cm or less | 8.3 | 0.6 |
| 1 to 2 cm | 17.8 | 8 |
| 2 to 4 cm | 63 | 84.1 |
| 4 cm or longer | 10.8 | 7.3 |
| Total | 100 | 100 |

As is clear from the results shown in Table 1, compared to the process for frying the noodles and then cutting the noodles, the process for cutting the noodles and then frying the noodles can obtain fried noodles of a desired length. When cutting the noodles after frying the noodles, the noodles are often damaged and most of the noodles produced were longer or shorter than 3 cm, which was the desired length. In other words, in terms of the yield as a purpose of obtaining instant noodles of a desired length, the process for frying the noodles after cutting the noodles demonstrated excellent effects.

Further, as is clear from FIGS. 1 and 2, while the method for cutting the noodles after frying the noodles generated asperity on the surface of the cut end portion, the method for frying the noodles after cutting the noodles resulted in achieving a uniform surface of the cut end portion.

Test Example 2

Reducing the Amount of Time for Frying the Noodles, Based on Fry Conditions

Various processes were tested in order to investigate more efficient frying treatment conditions.

Examples 2 to 6

Fried noodles were produced as follows. The same process as the one described in Example 1 was carried out until the noodles were cut into 3 cm in length. Approximately 95 g of the cut noodles was accommodated in a retainer that is the same size as the one described in Example 1, and showered with oil prior to being fried. Various other fry conditions were also tested. Palm oil was used as the frying oil.

In the next table, showering with oil prior to frying means that a shower of 145° C.-frying oil in an amount of 210 cc is applied to an upper part of the retainer immediately before being fried. The surface-flying treatment means frying the noodles in such a manner that 1 cm of the upper part of the retainer is not soaked in the frying oil (148 to 149° C.). The soak-frying treatment means frying the noodles while having the upper part of the retainer immersed below the frying oil level (the temperature of the frying oil: 148 to 149° C.). An oil-pouring treatment means that a shower of 210 cc frying oil (148 to 149° C.) is applied from above the retainer.

The noodles were fried until the weight of the resultant fried noodle reached 60 g. Table 2 below shows the results of the tests performed by combining various frying methods.

TABLE 2

| | Example 2 | Example 3 | Example 4 | Example 5 | Example 6 |
|---|---|---|---|---|---|
| Showering oil before frying | Absent | | | Present | |
| Frying step 1 (1 min after start of frying) | Surface-frying treatment | | | | |
| Frying step 2 (1 min after start of frying to end of flying) | Surface-frying treatment | Soak-frying treatment | Surface-frying treatment | Oil-pouring treatment | Soak-frying treatment |
| Total amount of time for frying | 135 seconds | 115 seconds | 125 seconds | 100 seconds | 100 seconds |
| Weight of resultant fried noodles | | | 60 g | | |

As is clear from the comparison between Example 2 and Example 4, the amount of time for frying the noodles was reduced as a result of the treatment for showering the noodles with the oil prior to frying.

As is clear from the comparison between Example 2 and Example 3, Example 3 in which the treatment was switched to the soak-frying treatment was able to shorten the amount of time for frying the noodles more than Example 2 in which only the surface-frying treatment was performed.

As is clear from the results of Example 5 and Example 6, the amount of time for frying was further shortened by combining the showering with oil before frying and the oil-pouring treatment or the soak-frying treatment after the surface-frying treatment.

Test Example 3

Effects of Soak Solution Added with the Binding Prevention Agent

Effects of soaking the noodles in soak solution containing the binding prevention agent were examined.

Examples 7 to 11

The same process as the one described in Example 1 was carried out until the noodles were braised. The braised noodles were let pass through flavoring solution added with various binding prevention agents shown in the next table and showered with water. The resultant noodles were cut at the rate of 300 times per minute to obtain noodles of 3 cm. Approximately 95 g of the cut noodles was accommodated in a retainer that is the same size as the one described in Example 1 and subjected to the frying treatment at 150° C. for one minute and 30 seconds in such a manner that 1 cm of an upper part of the retainer was not soaked in frying oil. Palm oil was used as the frying oil. Subsequent to the frying treatment, the retainer was flipped in order to remove the fried noodles. The difference in the level of binding (the state in which the fried noodles split apart) of the noodles accommodated in the retainer was examined for a situation where each of the binding prevention agents was used and a situation where none of the binding prevention agents was used. Note that the levels of binding of the noodles were evaluated based on the weight ratios of the split fried noodles that are gently placed in the cup. Table 3 below shows the results. Sucrose glycerin fatty acid ester was used as an emulsifier.

TABLE 3

| Mixture (g) | Example 1 | Example 7 | Example 8 | Example 9 | Example 10 | Example 11 |
|---|---|---|---|---|---|---|
| Salt | 0 | 10 | 0 | 10 | 0 | 0 |
| Soy dietary fiber | 0 | 0 | 1 | 1 | 0 | 0 |
| Gum arabic | 0 | 0 | 0 | 0 | 5 | 0 |
| Emulsifier | 0 | 0 | 0 | 0 | 0 | 5 |
| Water | 1000 | 990 | 999 | 989 | 995 | 995 |
| Total | 1000 | 1000 | 1000 | 1000 | 1000 | 1000 |
| Weight ratio of split noodles | 28% | 18% | 64% | 39% | 85% | 48% |

As is clear from the results shown in Table 3, it was found that the use of soy dietary fiber or gum arabic was able to encourage the split state of the fried noodles.

Test Example 4

Examining the Degrees of Separation and the Degrees of Swelling of the Fried Noodles Based on the Difference Among the Frying Treatments The braised noodles that are cut into 3 cm in length were accommodated in the retainer. This test had examined the impacts of changes in the height of the retainer with respect to the level of the frying oil used for frying the noodles, on the degrees of separation and the degrees of swelling of the fried noodles.

Comparative Example 2 and Examples 12 to 14

Noodles were produced as follows. Saline water in an amount of 2 g and water in an amount of 340 g were added to and mixed with 900 g of flour and 100 g of starch, to obtain dough, which was then compounded/rolled into a noodle band of 1.00 mm. This noodle band was cut into noodles by using a 9th angle cutting blade. The resultant noodles were braised at 150 kg/hr for 2 minutes. Flavoring solution was allowed to pass through the braised noodles for 10 seconds. Followed by a rinse with shower water, the resultant noodles were cut at the rate of 300 times per minute to obtain noodles of 3 cm. The noodles in an amount of 100 g were accommodated in each of seven compartments of a retainer having an opening of 13 cm wide, 14 cm long, and 5 cm deep, and a breathable lid of the same quality as the retainer was put on an upper part of the retainer. The retainer with the noodles was thrown into the frying oil. While changing the height of the retainer with respect to the frying oil level, the noodles were fried at 160° C. for one minute and 30 seconds. The lid was removed after the noodles were fried. The retainer was flipped in order to remove the fried noodles. The conditions of the fried noodles and the degrees of swelling of the same were examined.

The table below shows the results of these tests. In the table, "the height of the retainer with respect to the level of the frying oil" indicates the position (cm) of an upper end portion of the retainer with respect to the level of the frying oil when the noodles were fried. For instance, when this value is +1 cm, the upper end portion of the retainer is 1 cm higher than the level of the frying oil (surface-frying treatment). When this value is −2 cm, the upper end portion of the retainer is 2 cm below the level of the frying oil (soak-frying treatment). Note in Example 14 that the noodles were fried at +1 for the first 30 seconds (surface-frying treatment), and then the noodles were fried at −2 by soaking the retainer for the subsequent 60 seconds (soak-frying treatment). The results are shown in Table 4 below.

TABLE 4

|  | Comparative example 2 | Example 12 | Example 13 | Example 14 |
|---|---|---|---|---|
| The height of the retainer with respect to the level of the frying oil | −2 cm | +1 cm | +3 cm | +1 cm → −2 cm |

TABLE 4-continued

|  | Comparative example 2 | Example 12 | Example 13 | Example 14 |
|---|---|---|---|---|
| Conditions of the noodles | Clumpy | Almost split | Slightly clumpy at the bottom of the retainer | Almost split |
| Degree of swelling of the noodles | Many swollen portions | Few swollen portions | Few swollen portions | Few swollen portions |

As is clear from the results shown in Table 4, the fried noodles became clumpy in Comparative example 2 in which the noodles were subjected to the soak-frying treatment without going through the surface-frying treatment. Therefore, the noodles resulted in having many swollen portions. On the other hand, it was found that subjecting the noodles to the surface-frying treatment was able to keep the fried noodles apart from one another and generate few swollen portions (Examples 12 and 13). Moreover, it was found that, even when the soak-frying treatment was performed subsequent to the surface-frying treatment, the fried noodles were kept apart from one another and had few swollen portions (Example 14).

The invention claimed is:

1. A process for production of fried noodles having a length of 1 to 7 cm, comprising:
    preparing raw noodles;
    gelatinizing the raw noodles;
    cutting the gelatinized raw noodles into noodles having a length of 1 to 7 cm;
    frying the cut noodles by a surface frying method in which the cut noodles float in frying oil; and then soak frying the cut noodles in which the cut noodles are forcibly submerged in the frying oil.

2. A process for production of instant fried noodles, comprising:
    preparing raw noodles;
    gelatinizing the raw noodles;
    cutting the gelatinized raw noodles into noodles having a length of 1 to 7 cm;
    frying the cut noodles by a surface frying method in which the cut noodles float in frying oil; and then soak frying the cut noodles in which the cut noodles are forcibly submerged in the frying oil; and
    placing the resulting fried noodles in a cup.

* * * * *